United States Patent [19]

Goldstein et al.

[11] Patent Number: 4,758,003
[45] Date of Patent: Jul. 19, 1988

[54] METHOD AND APPARATUS FOR CHANGING PHYSICAL AND CHEMICAL PROPERTIES OF MATERIALS

[75] Inventors: Mark K. Goldstein, La Jolla; William H. Beatty, Jr., La Mesa, both of Calif.

[73] Assignee: Quantum Group, Inc., San Diego, Calif.

[21] Appl. No.: 648,271

[22] Filed: Sep. 6, 1984

Related U.S. Application Data

[63] Continuation-in-part of Ser. No. 597,181, Apr. 5, 1984, abandoned.

[51] Int. Cl.⁴ ............................................. F16J 15/14
[52] U.S. Cl. ........................................ 277/1; 277/26; 277/DIG. 6; 52/221; 52/232; 174/76; 174/77 R; 252/601; 252/606
[58] Field of Search ............... 277/1, DIG. 6, 26; 174/76, 77 R; 52/221, 232, 514; 252/601, 606

[56] References Cited

U.S. PATENT DOCUMENTS

| 3,022,190 | 2/1962 | Feldman et al. | |
|---|---|---|---|
| 3,455,850 | 7/1969 | Saunders et al. | 252/606 X |
| 3,714,047 | 1/1973 | Marion et al. | 252/601 X |
| 3,849,178 | 11/1974 | Feldman | 252/606 X |
| 3,916,057 | 10/1975 | Hatch et al. | 252/606 X |
| 3,973,074 | 8/1976 | de Lissa et al. | 252/606 X |
| 4,061,344 | 12/1977 | Bradley et al. | 277/26 |
| 4,069,284 | 1/1978 | Niimi et al. | |
| 4,083,902 | 4/1978 | Clyde et al. | |
| 4,106,962 | 8/1978 | Adams et al. | |
| 4,118,325 | 10/1978 | Becker et al. | 252/606 |
| 4,192,064 | 3/1980 | Kennedy et al. | |
| 4,221,092 | 9/1980 | Johnson | 52/232 |
| 4,320,076 | 3/1982 | Greenwood et al. | |
| 4,344,901 | 8/1982 | Keathley et al. | |
| 4,363,199 | 12/1982 | Kucheria et al. | 52/221 |
| 4,384,048 | 5/1983 | Bathgate et al. | |
| 4,419,196 | 12/1983 | Beckerick et al. | |

FOREIGN PATENT DOCUMENTS

| 48-25741 | 7/1973 | Japan | 277/26 |
|---|---|---|---|
| 59-1874 | 1/1984 | Japan | 277/DIG. 6 |
| 35819 | 11/1913 | Sweden | 252/601 |
| 1084503 | 9/1967 | United Kingdom | 52/232 |

OTHER PUBLICATIONS

Proceedings of the 25th Wire and Cable Symposium, Yabuki et al., pp. 340-349.
Eccofoam Brochure, Emerson & Cumming, Inc., Oct. 1970, 4 pages, "Plastic and Ceramic Foams".

Primary Examiner—Robert S. Ward
Attorney, Agent, or Firm—Christie, Parker & Hale

[57] ABSTRACT

A method for sealing a port in a wall through which an element is passed, comprising the steps of combining a water based fire-resistant liquid sealing material and a solid water absorbing means which will swell to prevent shrinkage to form a mixture that seals, and introducing the mixture into the port to seal the port. Materials and compositions for carrying out the method are disclosed.

32 Claims, 19 Drawing Sheets

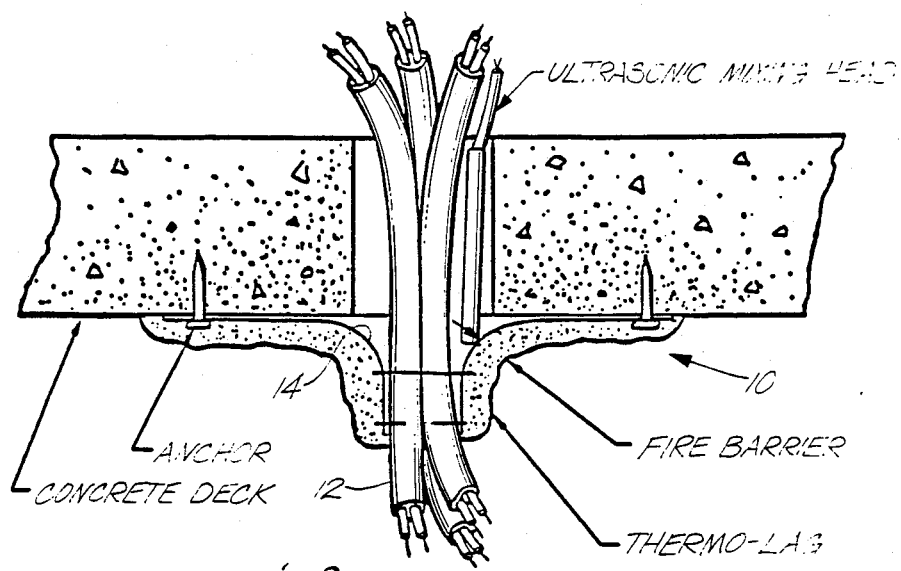
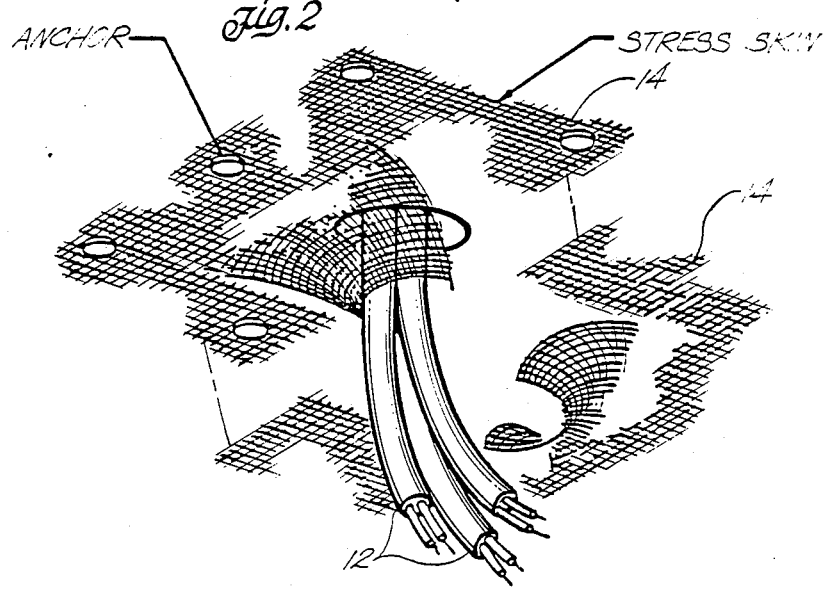

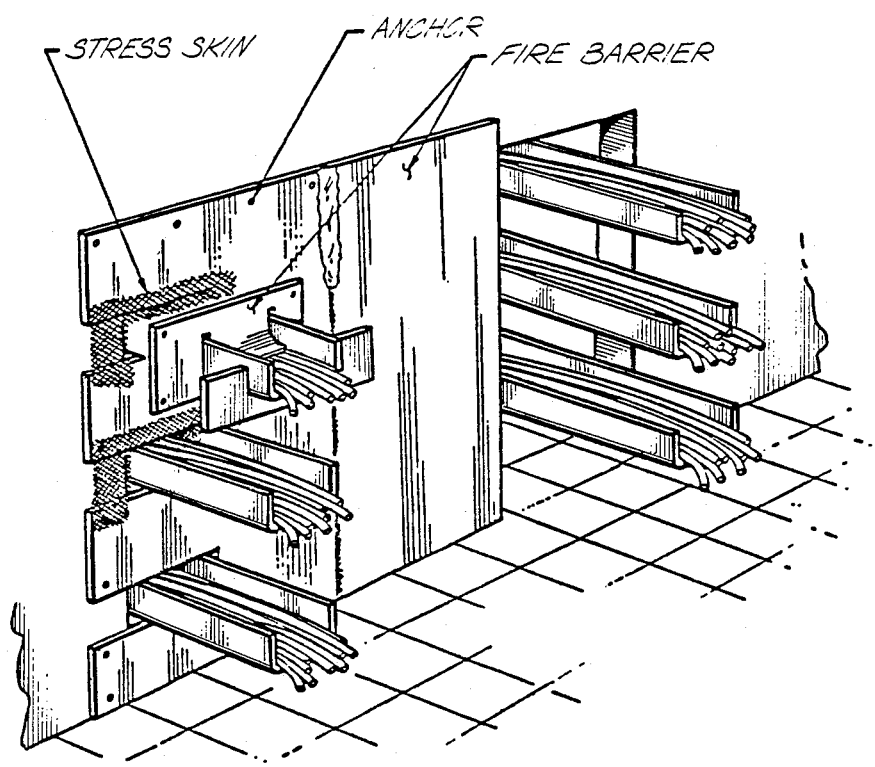

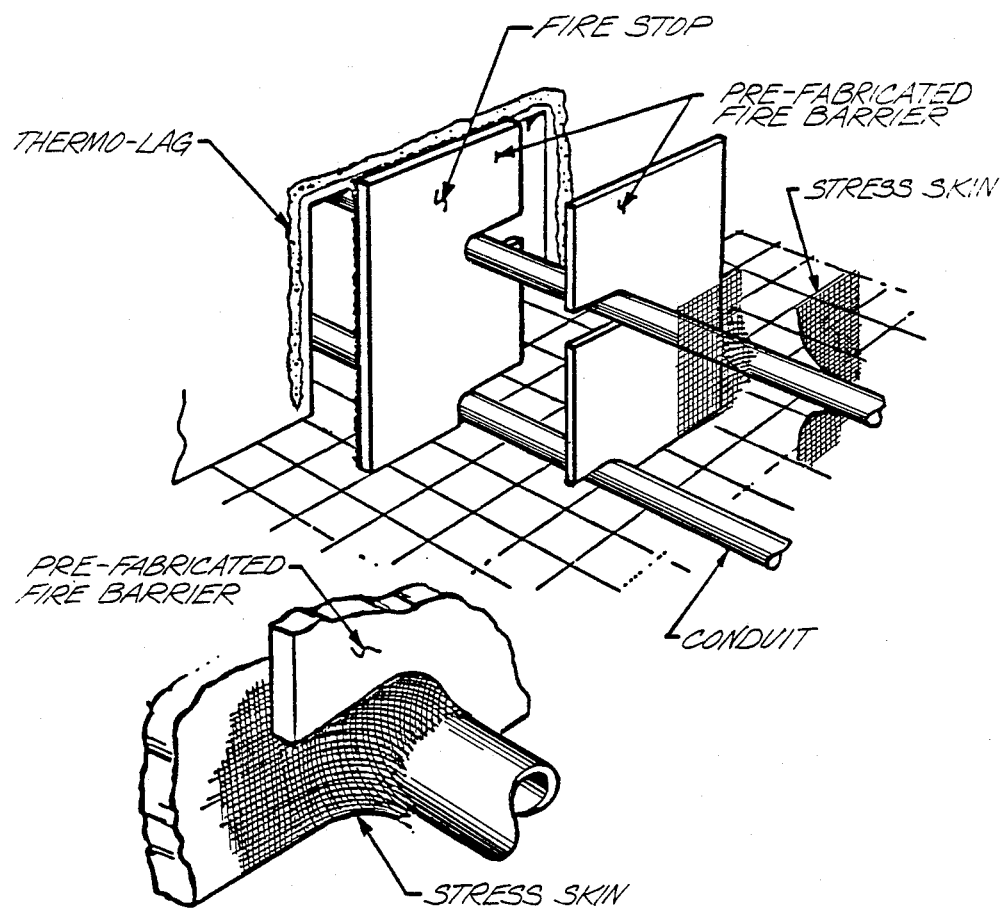

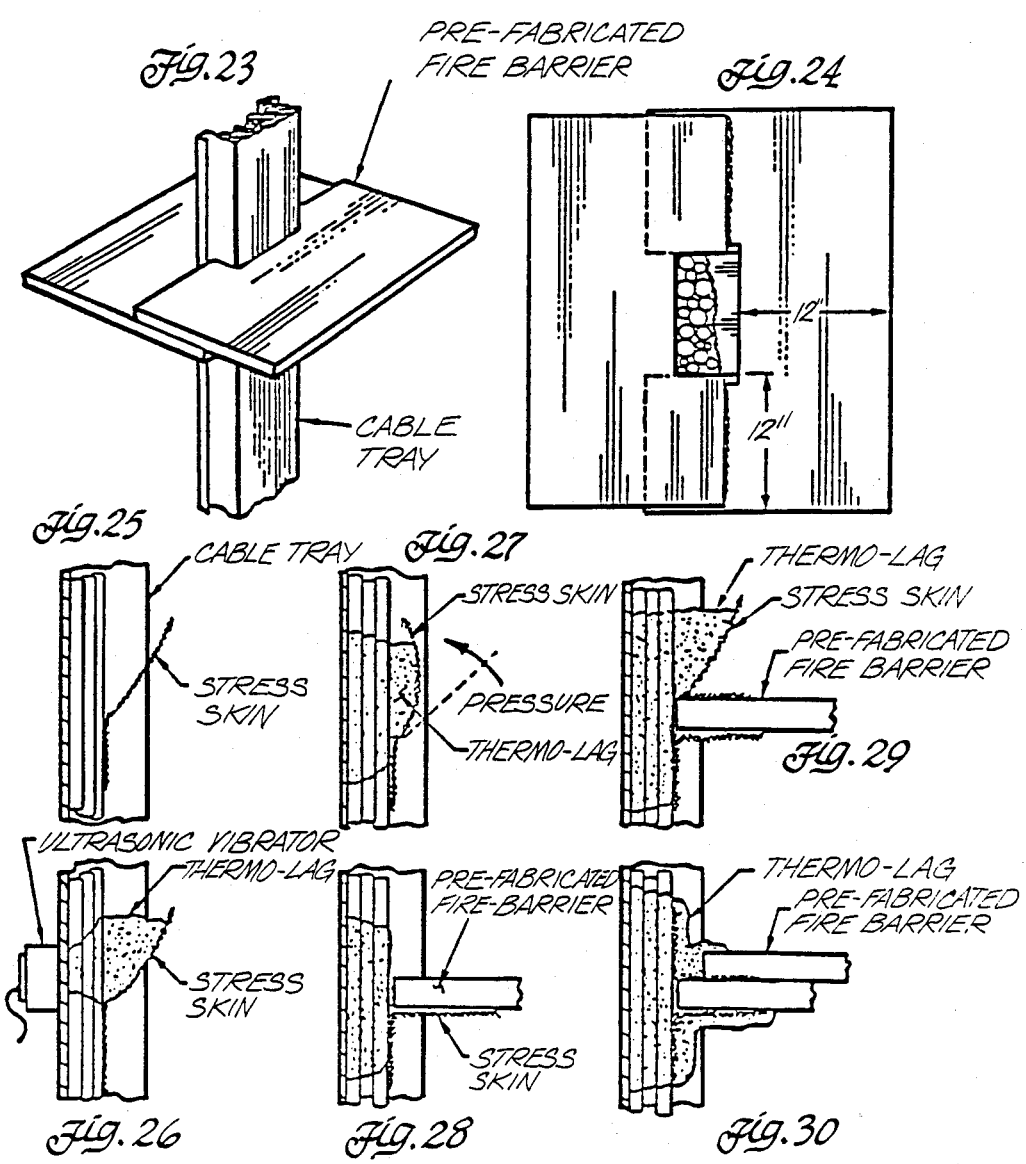

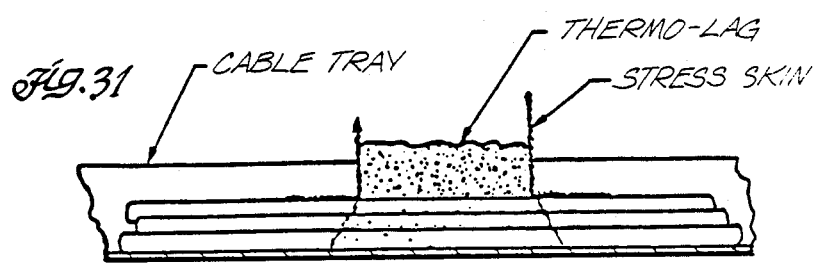
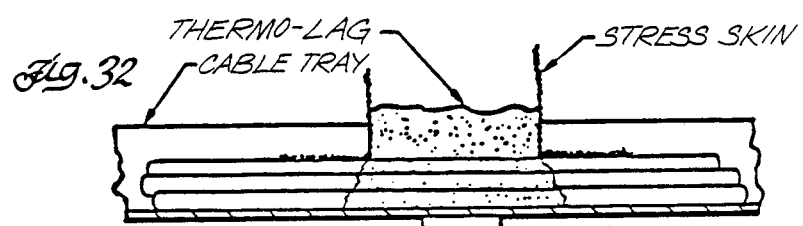
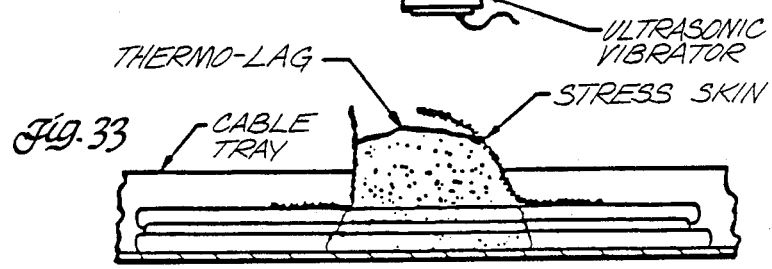
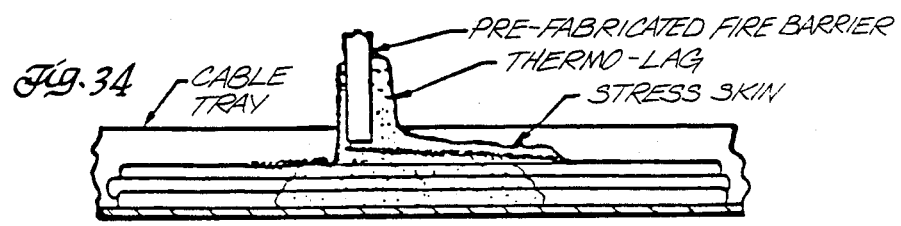

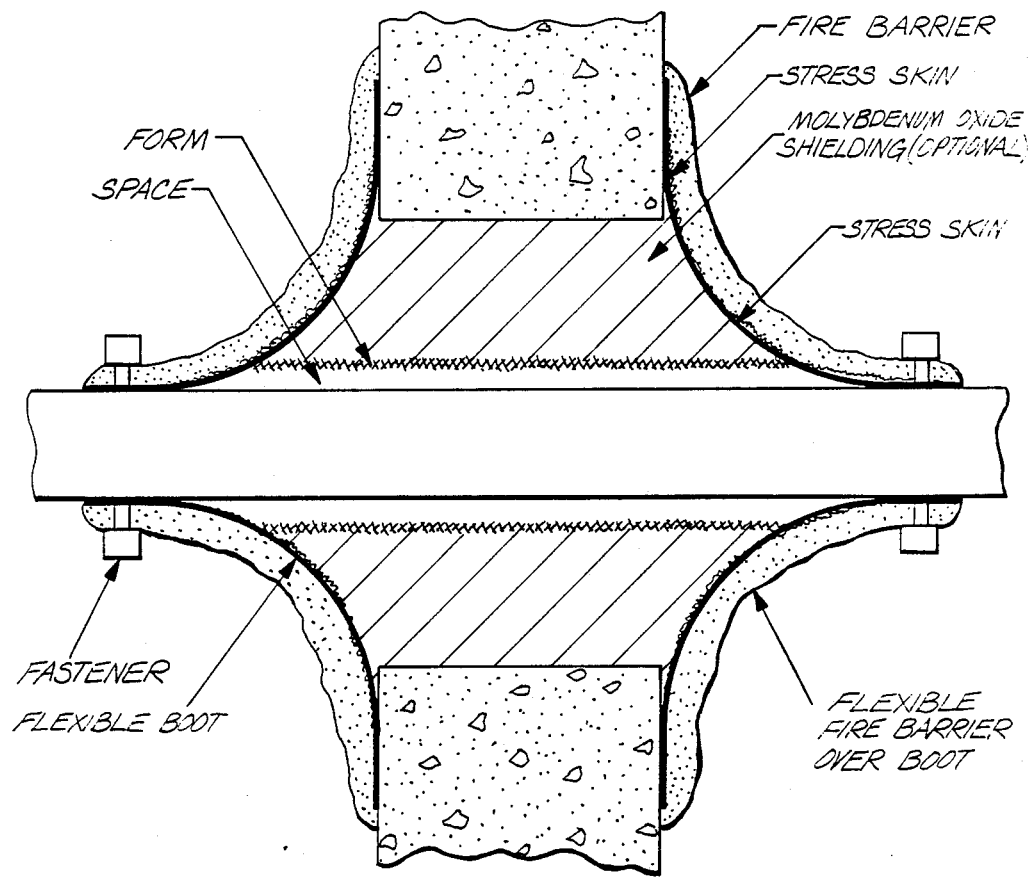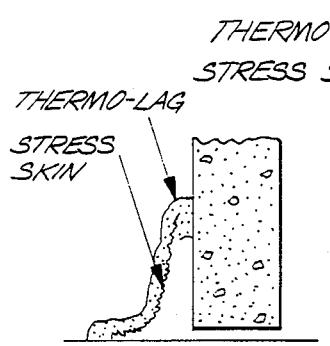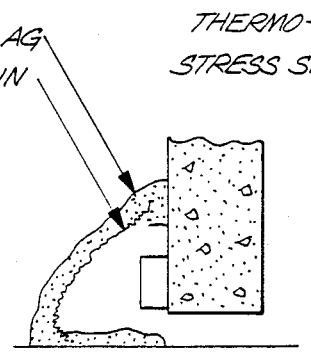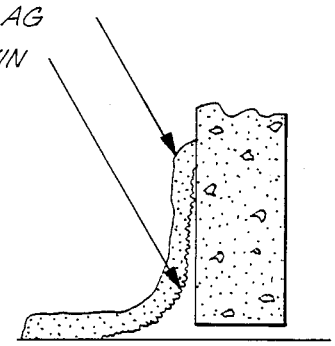

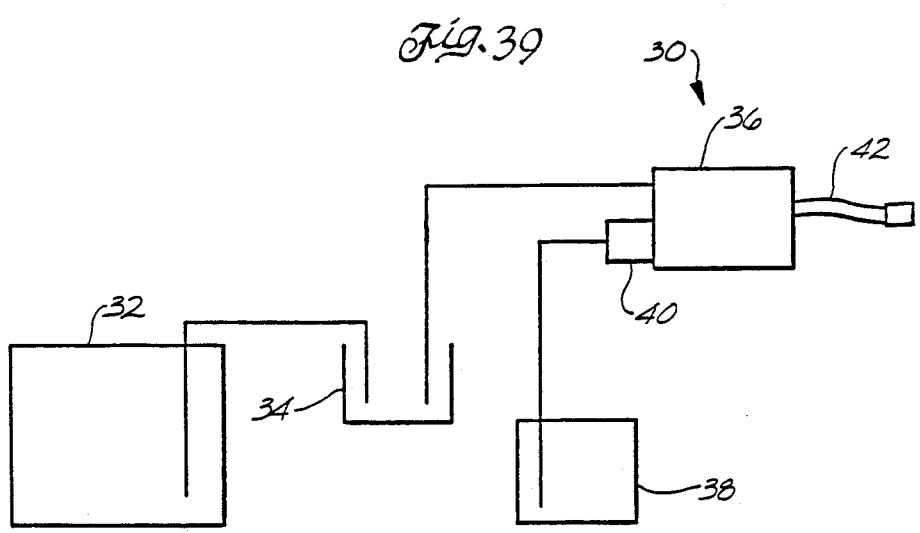

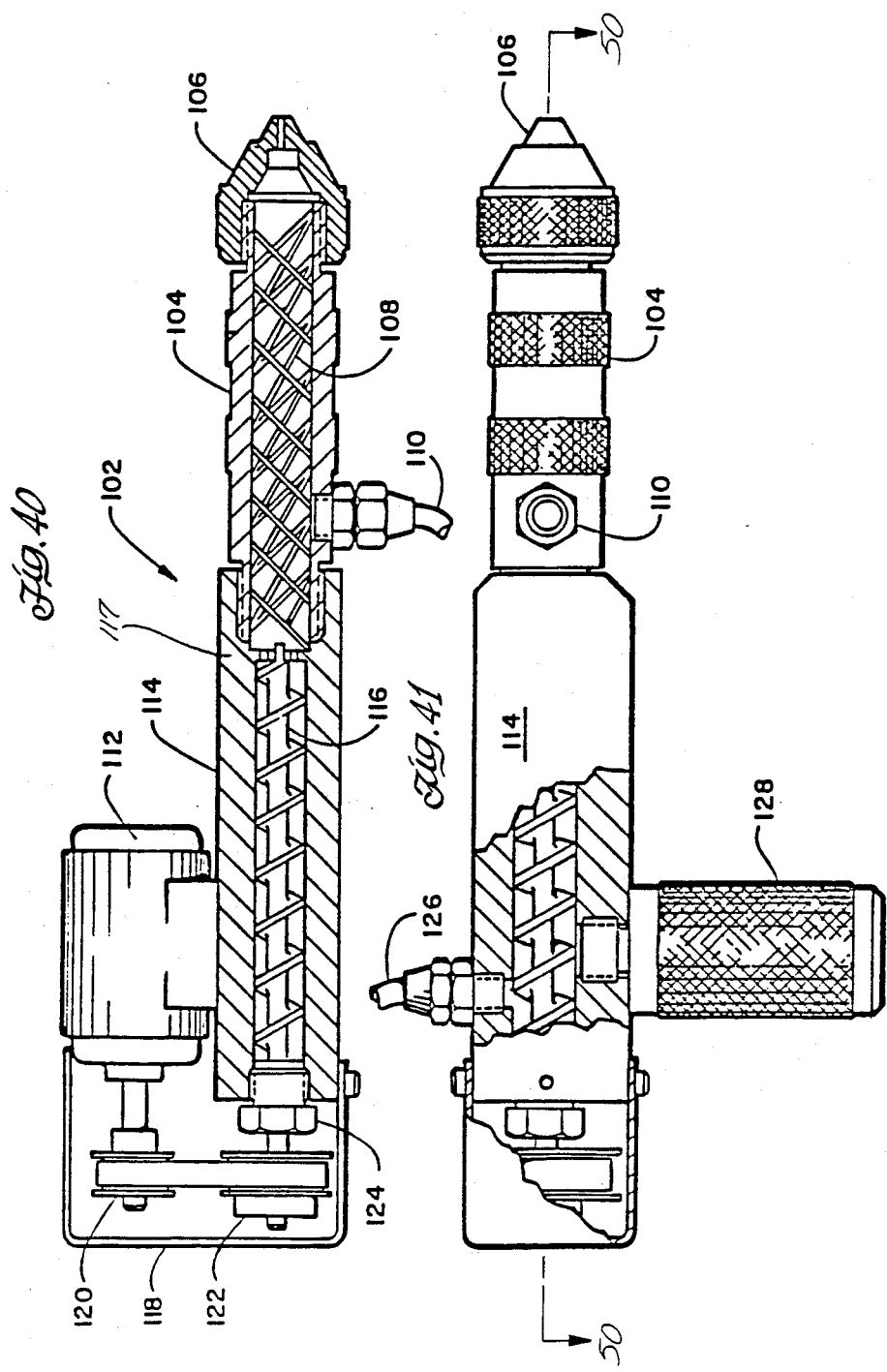

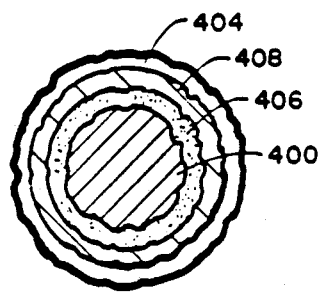
Fig. 42
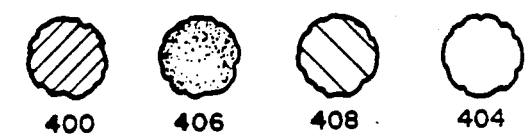
Fig. 43
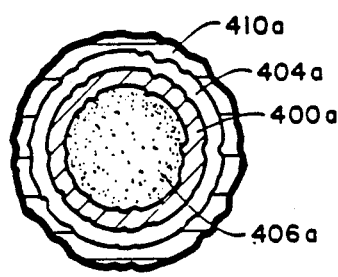
Fig. 44
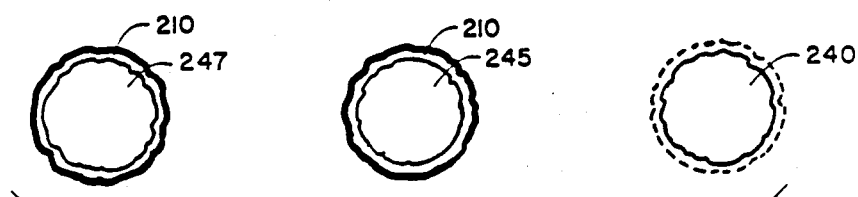
Fig. 45
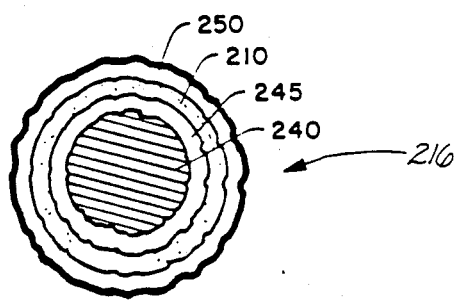
Fig. 46

METHOD AND APPARATUS FOR CHANGING PHYSICAL AND CHEMICAL PROPERTIES OF MATERIALS

CROSS REFERENCE TO RELATED APPLICATIONS

This is a continuation-in-part of Ultrasonic and Sonic Methods of Changing Physical and Chemical Properties of Materials, filed April 5, 1984, Ser. No. 597,181, now abandoned.

FIELD OF THE INVENTION

This invention relates to methods and apparatus for additional mixing of a component or components after initial mixing with or application to another component and more specifically to methods and apparatus for forming seals in walls, floors and other partitions to prevent penetration by fire, water, chemicals, radiation, etc.

BACKGROUND OF THE INVENTION

The invention pertains to a method and apparatus for mixing compounds that have at least one component isolated from reactivity until just before dispersing the active component or components. This dispersion process may be initiated by physically mixing or by physical mixing in combination with applying an ultrasonic nozzle or probe nearby or into the mixture. The active components may be isolated by several techniques including microencapsulation, coating with inert or inactive material and/or active material, agglomeration and other protective films which can be removed or broken by agitation or solvents or other chemical attack, or with sonic and/or ultrasonic signals of various specific frequencies depending on the application. In one application, powdered or agglomerated particles can be mixed with a water-based mastic just before dispensing. The agglomerated particles may in turn be coated with at least one passive (time release) or active material. The active species may contain any materials which upon contact with the liquid material will foam and expand and/or an adsorbent material which chemically or physically binds the water in the liquid to prevent shrinking and enhance drying in thick applications of the mix into locations often difficult to dry. This invention also pertains to all applications of this technique.

One application of the invention pertains to various fire stops and other penetration seals for application of sealing walls, slots, and floor penetrations for cable trays, conduits, pipes, cables and other penetrations. Parts of the penetration seals are designed to hold water, pressure, radiation, and prevent chemical, radiological, and bacterial contamination. The application of these fire stop-seals are to power plants, military facilities, ships, offshore energy facilities, chemical and other energy facilities, and other installations requiring penetration seals/fire stops. These seals have the advantage of low ampacity derating on electrical cables, easy installation, low cost, easy retrofit, easy modification, seismic resistances, resistance to radiation, chemical and biological agents as well as fire protection. These properties have become important in collective protective system (CPS) aboard military ships. These CPS areas protect the crew from radiation, chemical and biological weapons contamination.

Electrical cable fire stop protection has been recognized as important for many years, but the advent of nuclear power and Brown's Ferry Reactor accident has led to improved fire stop and penetration seal systems for all applications. Reg. Guide 1.75 September 1978 Revision 1 clearly describes the need for separation of electrical circuits such that no single failure will result in a loss of protective function. Appendix R and IEEE Standard 279-1971 are also concerned with separation and safety protection. THERMO-LAG subliming compound has been used to accomplish the dissipation of heat from fire and other sources, U.S. Pat. No. 3,022,190. THERMO-LAG is a registered trademark of Thermal Science Incorporated (TSI, Inc.). There are today several approved THERMO-LAG systems which meet electrical standards set by the safety shutdown systems of nuclear power plants and which meet the guidelines described in Appendix R and Reg. Guide 1.75; however, there is no approved penetration seal using any THERMO-LAG products or other water-based thermal protective compounds. One reason is because the material shrinks as it dries. Therefore to prevent cracking, the material must be applied in many thin layers, allowed to dry and then reapplied. This takes many weeks and much costly labor and is not costcompetitive or desirable.

Several standards exist for Various Penetration Fire-Stops including Underwriters Unlimited "Fire-Testing Penetration Fire-Stop", UL 1479, IEEE Standard for "Cable Penetration for Fire", IEEE 63, and ASTM E-814.

Silicone foam material, which expands in place, and other similar compounds are used for penetration seals throughout the industry although it takes up to nine inches thick to equal two to three inches thick of Ultraseal THERMO-LAG/three component mix fire barrier. Silicone foam burns and emits toxic products. Many penetration seal systems exist that meet E-119 fire stops test for one-and three-hour fire walls. These are expensive because of the large quantity of material and time required to completely fill the gap in the wall with a fire resistant material. The silicone form requires precision cut and fit damming boards on both sides of the opening which take a great deal of time to prepare and place and therefore are very costly. These materials (e.g., silicone foam) are usually good insulating materials and since that requires as much as nine inches of sealing length to obtain a three hour rating, the cable often must be derated because the insulated region caused a hot spot in the cable.

On military ships the added thickness and weight are problems because of the need for additional space and the importance of a low center of gravity and light weight. Therefore, there is a need for a low cost, low weight, low volume, vibration-resistant, easily repaired, rapidly sealing, expanding, easily installed, non-toxic, non-burning, and waterbased penetration fire stop and seal. There is also a requirement in certain applications to add additional cables or other penetrating objects, without the use of sharp drills or other similar devices.

Thus, there is a need for a foam in place penetration material which does not require a custom fit damming system and that will be less expensive, easily installed, weighs less, smaller volume, and minimizes effects on ampacity.

OBJECTIVE OF THE INVENTION

It is the objective of this invention to change the properties of mixtures that have been placed in one form for easy application to another form which is desired at a later time or just after dispensing into a penetration or other void. One objective of this invention is to find an inexpensive and rapid means to use a water-based subliming mastic or other active composite (such as intumescing or endothermically decomposing compounds) to make highly fire resistant materials for penetration seals which are light weight and low volume as well as low toxicity. Another advantage is a two to three inch thick sealed area that does not require electrical cable to be derated. It is another objective of the system to produce fire stops and seals that meet a variety of requirements such as accommodate movements, provide nuclear radiation shields, and meet toxic chemicals and gases, as well as vibrational and seismic standards. The objective of this system is to produce a variety of fire stop designs that can be installed quickly and at low cost, that dries, hardens and cures faster than previously applied materials, and which does not shrink, and expand to a predetermined volume by controlling certain foaming agent additives. In addition, it is desirable to be able to add additional cables or remove old cable with minimum cost at a later date and without the use of metal tools because metal tools such as drills can cause electrical shock and death.

It is an object of the invention to seal collective protective system areas on military ships and other facilities against radiological, chemical, and biological weapons as well as against fire and explosions without endangering ship performance. The light weight, small volume Ultraseal THERMO-LAG and other Ultraseal mixture applied CPS Fire Stop/Seals accomplish this goal.

It is also an object of the invention to provide a fast curing, expanding mixture by adding a material during the dispensing operation. One method uses chemically-bound water which improves fire resistance, we believe, so that large quantities of energy will be consumed in decomposing the chemically-bound water thus improving the thermal protection of the system as well as improved installation and reduced cost. This water-adsorbing material may be configured to draw the moisture from any water-based coating in such a manner as to reduce adverse effects of normal evaporative curing and shrinking, in particular, allowing larger coatings or thicknesses in one application and eliminating the problem of multiple applications for preventing cracking.

It is also an object to provide a mixture produced by the addition of several solid chemicals which foams the mixture upon contact with the liquid. The addition of water adsorbing or absorbing solid is optional but preferred in such systems. This process produces a variety of sealant materials of varying expanding capabilities and hardening rates as well as curing times, depending on quantities of additives and their ratios.

Other objects of the invention include the application of mixing isolated components by ultrasonics for purposes of:

1. Providing explosive bolts—releasing one or more reactive species to initiate an explosion;
2. Chemical and pharmaceutical storage—mixing microencapsulated or thin film protected drugs or chemicals in isolated form so they keep with special storage;
3. Use in chemical or medical test kits—the compound used for testing is activated by ultrasonics;
4. Release mechanisms—mold separations by releasing binding layer thin film to effect separation;
5. Chemical processing—to inplant catalysts or reactive species homogeneously before reaction is initiated, e.g., the preinjection of isolated components of mixture to be foamed. This technique could have numerous applications in military damage control and in the use of inflatables;
6. Production of images—sonic and photo films and developing such films to produce sonic images from sonic film, e.g., in pipe welding tests;
7. Penetration seals and firestops—to change viscosity in liquids, e.g., pouring mixture into pipe and causing it to fall by gravity or pressure to a specific location for setting by ultrasonic or sonic activation;
8. Low temperature welding and adhesive bonding—thin film seals by expansion of volume or release of bonding agents permanently bonding cards and other objects after positioning is confirmed—cold joint welding and removal by releasing solvent to weld plastics and disassemble in a reverse manner with isolated forms responding to a different frequency;
9. Food storage—to prevent spoilage by dehydration and microencapsulation of water, e.g., mixing of mixtures that spoil—drugs, paints, medication and glue;
10. Nuclear fuel disassembly, containing ultrasonic activators;
11. Self destruct systems, containing ultrasonic activators; and
12. Removal of old paints and other coatings that contain microsphere or other sonic or ultrasonic activators.

Other non-ultrasonic techniques include:
13. The use of solvent release foaming agents wherein soluble coatings are formed on particles of the various active ingredients so that one active ingredient does not combine with another until both coatings are dissolved by a suitable solvent, such as water;
14. The use of multi-layered solids wherein one active ingredient is coated with a first passive layer and then coated again with another active species followed by a second passive layer of the same or different type as the first; the two species react with one another only after both coatings are removed or otherwise breached;
15. The use of a mix of solid which accomplishes selective reaction as a result of the fact that reaction rate is determined by particle size and particle solubility;
16. The use of time release coatings and solids which dissolve and release active solids or liquids for forming and/or hardening and curing the mixture;
17. The use of coatings that are mechanically broken by a pumping system or grinding mechanism incorporated into the dispensing apparatus.

SUMMARY OF THE INVENTION

The invention pertains to methods and apparatus for changing the physical and chemical properties of mixtures (in the liquid or solid form) by physically mixing or sonic or ultrasonically releasing into one component at least one other component which is isolated, for example by agglomeration (solid particles where the rate of reaction can be controlled by surface area and particle size as well as reaction rates) or by a thin protective film or layer (which may dissolve at a predetermined rate). The thin protective layer is constructed to break apart and release one or more active ingredients.

The invention pertains to novel methods and apparatus for distributing and sealing voids in cable trays, conduit, and other systems using at least one of the application of pressure, ultrasound and/or mechanical mixing to change the viscosity of a liquid fire stop compound from low to high viscosity. One technique to effect rapid hardening is irradiation with certain ultrasonic frequencies. The fire stops may consist of prefabricated overlapping fire resistant active (subliming) or passive (insulating) materials and liquid application to fill voids and reinforce joints. The flat rectangular board-type shapes may be prefabricated from Ultraseal or other subliming materials. Another novel aspect of the invention is to obtain sealing at the edge of the wall by overlap instead of trying to fill the whole gap in the fire wall or other penetration. This technique is made practical by active subliming or other endothermic technology which produce up to three-hour fire walls with one inch of prefab board, e.g., THERMO-LAG 330-1. The prefab shapes allow low cost rapid installation because of their novel design. The changing viscosity feature prevents running of the liquid material when applied to vertical or horizontal penetrations, particularly running within cable trays or along groups of cables and instrument lines. In addition, the changes in viscosity may also provide expansion of the material due to chemical action caused by the ultrasonically activated additive or by simple chemical activation.

The use of a water-adsorbing material as an additive/mixing agent has an additional advantage in improving the fire and thermal protection of the fast hardening non-shrinking compound. The water that normally evaporates off the THERMO-LAG is believed to be chemically-hydrated and held as a solid in the mixture. The application of high temperatures will endothermically reverse this chemical reaction. The energy required to release the water and evaporate it to steam enhances the thermal-protective and fire-protective properties of the mixed compound.

Foaming agent may be added separately (as a mixture of solids) or as multiple layers of chemical one atop the other. Each layer may be separated from the other by a passive (inert material) layer, which surrounds the water-adsorbing and expanding material, which passive layer dissolves on contact with the liquid mixture. For example, bentonite may be coated with a mild solid acid such as oxalic, malonic and other polycarboxylic acids then coated with a water-soluble coating such as an inorganic salt of neutral pH such as sodium borate, sodium silicate, or any other neutral water-soluble material such as a solid alcohol or other material well known in the coating technology. Then a layer of basic solid such as a bicarbonate is coated over the neutral layer. The coating may be accomplished in a fluidized bed, spraying with concentrated solution, or by dipping or immersing the bentonite particles at least once in a concentrated solution of the coating material. The passive layer may be applied in the absence of water.

The multiple-layered particles of bentonite are then added to an ultrasonic mixing gun and mixed with THERMO-LAG 330-1 or other water-based sealant material. The amount of active materials used for coating can be controlled to produce foaming in the subliming mastic and other water-based sealants. The reaction causes the release of carbon dioxide and the changing of the elastic properties of the overall mixture when cured. The new Ultraseal materials have a resiliency similar to silicone foam or rubber foam.

The method of formation of the seal in a wall through which conduit or electrical trays pass includes mixing an active agent with a sealing material and applying the mixture to seal the wall. The mixing and sealing changes the characteristics of the sealing material to form a good seal. In one form of the invention, the active agent may be inert with respect to the sealing material until a time after the initial mixing so that the changing of the characteristics of the sealing material may be delayed to a later time. For example, it may be desirable to change the characteristics of the sealing material only after the mixture is applied to the wall. The active agent may be activated by physical vibration of the mixture, by the application of ultrasonic energy to break up microspheres in which the active agent may be confined, or by the delay inherent in the reaction rate of two solid components as a result of particle size, surface area, solubility and temperature. Alternatively, the active agent may be enclosed within an inert material that is broken apart by applying pressure or other mechanical forces. In another form, the active material may be coated with an inert material after which the active agent is released by either physical breaking of the inert coating or by dissolution of the coating followed by release of the active agent.

The active agent may be a substance which causes the sealing material to foam or expand upon reaction of the active agent with the sealing material. The active agent reacts with moisture in the sealing material to reduce the viscosity of the sealing material and to reduce evaporation of the moisture from the sealing material as the material cures. The reaction may also serve to prevent shrinkage and promote hardening and curing. The active agent may be in the form of solid water-absorbing means, for example bentonite, which will swell to prevent shrinkage for forming the seal. Bentonite is a hydrophilic material that swells upon hydration and forms an improved seal. The bentonite may be applied immediately prior to application of the mixture to the penetration or void in the wall. The bentonite offers improved fire resistant properties in conjunction with the use of a fire resistant sealing material due to the fact that the water molecules are retained by the bentonite in the mixture.

In one form of the invention, the sealing material comprises a fire protection and sealing material, for example the material known as THERMO-LAG 330-1, a chemical system that absorbs heat when the temperature of the sealing material reaches a specific temperature. In one form of the invention, the sealing material sublimes when the temperature of the material reaches the specific temperature. In another form, the material intumesces and is also endothermic prior to sublimation of the material itself.

As a further example, where the sealing material is a fire resistant sealing material such as THERMO-LAG, the active agents may absorb or adsorb water and foam within the sealing material which changes the viscosity of the mixed sealing material. This may be done as discussed above using the microencapsulated method followed by breaking apart thereof with ultrasound or physical application of forces, multi-layered solid technique wherein the coatings on the multi-layered solid particles are dissolved after which the two active agents can react or the time release dissolution technique wherein each active agent is in the form of particles, each with their own passive or inert coating which is dissolved by an appropriate solvent, such as water. Similarly, the curing of the mixture may be accomplished when the rate of reaction is determined by the particle size and dissolution characteristics of the solid.

In the technique where the characteristics of the sealing material are changed by a foaming operation, the foam may be produced by a gas-producing means such as where a polycarboxylic acid is combined with a compound such as carbonate for producing carbon dioxide. Preferably, the carboxylic acid is a low carbon number compound such as oxalic acid whereby all of the carbons are consumed in the carbon dioxide-producing reaction. The eliminates any remaining carbon atoms which may be consumed during oxidation due to a fire. If unoxidized carbon atoms remained after the foaming step, hazardous carbon products of combustion may be produced during a fire. The bicarbonate may be sodium or ammonium bicarbonate or other well known bicarbonates. These agents are preferably used with a water-based sealing material such as the above-mentioned THERMO-LAG.

In the case where two active agents are to be used for producing the foaming reaction, one of the active agents may be mixed with the sealing material as desired while the other active agent may be mixed with the sealing material—first active agent mixture just prior to application of the mixture to the wall. The rate of reaction may be controlled through methods as described above. In the case where oxalic acid or oxalate and bicarbonates are used as the active agents comprising the gas-forming means, water is produced during the gas-forming reaction. In such a case, it may be desirable to provide a third active agent such as bentonite for absorbing the excess water produced during the gas-forming step. The concentrations of the oxalic acid or oxalate, the bicarbonate and the bentonite may be varied as desired to produce the desired consistency, curing time and density of the resulting fire stop seal. After application of the sealing material to a void in the wall, the mixture expands due to the production of gas, and due to the absorption of water or swelling of the water-absorbing material, bentonite.

It is contemplated that the polycarboxylic acids may be oxalic, tartaric, citric, acetic, formic and malonic acids. However, longer chain acids may leave a residual chain of carbon atoms after reaction with the bicarbonate or other reactant. These carbon products left behind provide fuel for the fire which is counterproductive.

DRAWINGS

FIG. 1 illustrates in transverse cross section a cable penetratior through a floor;

FIG. 2 illustrates pictorially and partly exploded, the floor penetration of FIG. 1;

FIG. 3 is a perspective view of a multiple cable tray wall penetration;

FIG. 21 is an exploded view of a multiple conduit fire stop penetration through a wall;

FIG. 22 is a fragmentary pictorial view of the wall penetration of FIG. 21;

FIG. 23 is a pictorial view of a fire break for a cable tray;

FIG. 24 is an end view of the fire break of FIG. 23;

FIGS. 25 to 30 illustrate in transverse cross section a series of installation steps employed for fabricating the fire barrier of FIGS. 23 and 24;

FIGS. 31 to 34 illustrate in transverse cross section a series of installation steps for a fire barrier in a cable tray;

FIG. 35 illustrates in transverse cross section a pipe penetration through a wall which permits movement of the pipe;

FIG. 36 illustrates in transverse cross section a fire barrier for adjacent walls;

FIG. 37 is an alternative embodiment of a fire barrier for adjacent walls;

FIG. 38 is still another embodiment of a fire barrier for adjacent walls;

FIG. 39 illustrates schematically mixing of fire barrier material;

FIG. 40 is a longitudinal cross section of a mixing gun;

FIG. 41 is a side view of such mixing gun;

FIG. 42 is a transverse cross section of a layer particle of a foaming material for a fire barrier;

FIG. 43 illustrates the core for exemplary particles as illustrated in FIG. 42;

FIG. 44 illustrates in transverse cross section another embodiment of layered particle;

FIG. 45 illustrates alternative cores for a particle as illustrated in FIG. 44; and FIG. 46 illustrates another embodiment of multiple layered particle.

Figure 4:
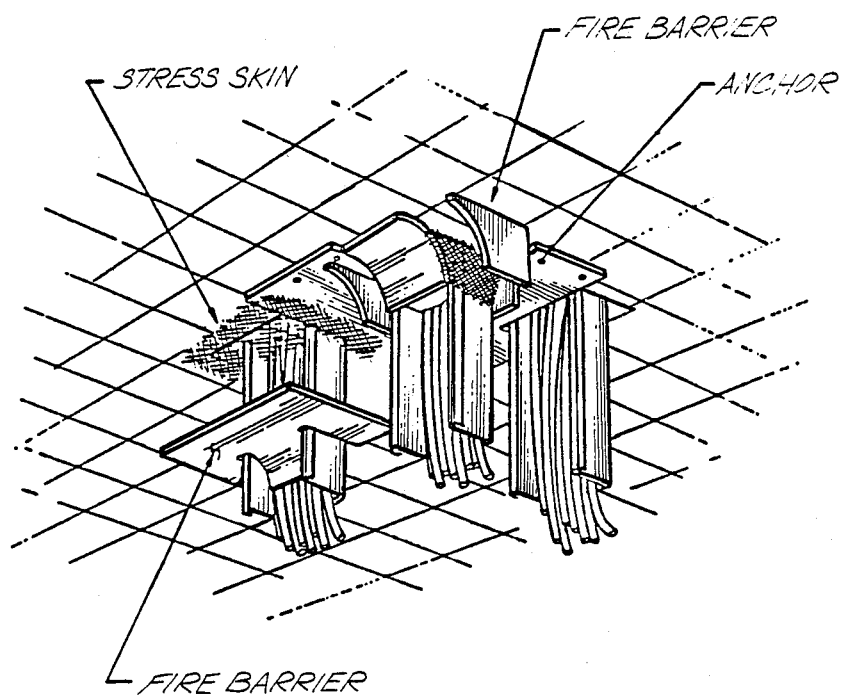
FIG. 4 is a bottom pictorial view of a multiple cable tray floor penetration.
Figure 5:
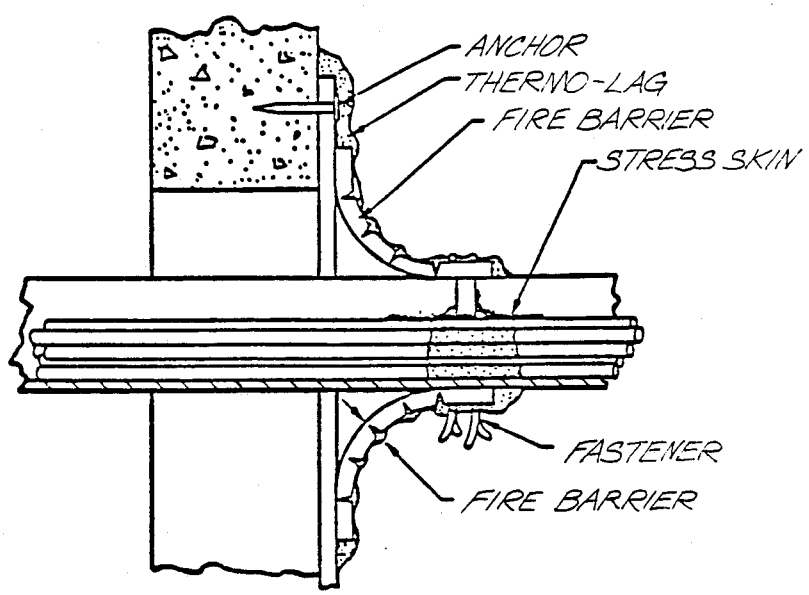
FIG. 5 is a transverse cross section of a single cable tray wall penetration.
Figure 6:
FIG. 6 is a side view of a prefabricated fire barrier which can be bent to form a wall penetration as illustrated in FIG. 5.

The drawings 1-38 show both application of the two-part (prefabricated sections and foam) system and the single spray foam system as fire stop and penetration materials. The novel installation procedures for Ultraseal spray method of constructing fire stops on multiple cables is illustrated in FIGS. 1 and 34. FIG. 1 shows the completed one hour fire rated seal 10. Fire stops for cables 12 or for tray, conduit and other penetrating objects can be constructed in a similar manner. FIG. 1 illustrates the simple stress skin fabrication and assembly for floor penetration by cables 12 using stress skin 14 such as stress skin 330-69, as shown in FIG. 2. To increase the rating and improve the seal for multiple cable penetration of a ceiling or deck site, liquid fire stop material may be added from above and ultrasonically (optional) dispersed as shown in FIG. 1. Additional wire wrap and/or mechanical fastener may be attached as the application of vibrations or ultrasonics enhance rapid and reliable void removal and promotes sealing by adsorption of water or expansion or both.

Mechanical mixing guns which mix solid foaming agents in the dispensing system can also be employed. A time release coating can further control the amount and rate of foaming. This process is particularly useful if a large number of vertical cables are to be sealed. After this procedure all fasteners will be covered with at least two inches of Ultraseal material for one-hour fire stop and three inches for three-hour. Other sealing materials may require different thicknesses but the procedure and application of ultrasonics or chemically activated (e.g., time release) viscosity and volume changes assure reduced cost and higher reliability. The addition of certain thickening additives such as bentonite and foaming agents (in the form of microspheres or agglomerated particles (e.g., in solid chemicals the particle size and surface area determine the rate of mixing by dissolution and foaming and water absorbing. The system may be fully activated by at least one of an ultrasonic device or mechanical mixing device, shown in FIGS. 40 and 41, to assure greatest reliability and speed. In addition, a water absorbing and/or adsorbing volume-expanding material such as bentonite, bulk fibers, silica gel, zeolite or clays may be incorporated in the microspheres or agglomerated particles, either by themselves or in combination with a promoter catalyst or foaming agents. When bentonite in the form of agglomerated particles or powder is used alone, an improved seal is provided which rapidly hardens and cures, producing a dense reliable void removal fire-stop and penetration seal. Benonite prevents shrinkage due to loss of water due to evaporation, preventing cracking of the seal. The use of bentonite does not require subsequent reapplication of the mixture to fill cracks, etc., due to shrinkage and subsequent loss of volume of the seal.

The bentonite may be applied with the sealing material to the area to be sealed through an applicator or gun (FIGS. 40 and 41). FIG. 39 schematically shows the sealing material (not shown) such as subliming THERMO-LAG is taken from a holding container 32 by a pump 34 to the gun 30 where the sealing material is introduced to a mixing chamber 36. At least one foaming additive and the bentonite are taken from a container 38 and pumped by mechanical or pressure means to a metering device 40 including a vibrator (optional and not shown) for metering the foaming additive and water-absorbent additive (such as bentonite) and for maintaining the flow and preventing clogging. The vibrator may be agitated mechanically or sonically. Alternately, a pressure or auger system may be used to move and meter the additives. FIGS. 40 and 41 show the metered additives introduced into the mixing chamber 114, where it is mechanically mixed with the sealing material using a mechanical mixing means 108, such as shown in FIGS. 40 and 41, and discharged or extruded through a sieve (not shown) to an applicator nozzle 106 to be applied to the sealing area.

In one embodiment, 1 to 15% of from 200-mesh additives are mixed by weight or volume, preferably 3 to 8% by weight, with the sealing material to provide a good water, air, and fire seal. The ratio is dependent partly on the weight, grade, or water concentration of subliming system (e.g., THERMO-LAG-330-1), the ratio being determined by the amount of water required to be taken up and volume expansion required. The application of the Ultraseal may be to any penetration, such as between cables, in and around cables, walls and floor openings, cable trays, conduits, and surrounding environments.

Additional installation procedures are represented in FIGS. 3 through 38. For example, FIG. 3 shows a wall slot penetration for cable trays. FIG. 4 shows a floor slot penetration of same for horizontal fire stop. The first step is to set up dams made from wire mesh, screen, or stress skin material. An example of this procedure is to cut two 8 to 12 inch sections of Stressskin 330-69 or other stress screen (SS) and bend to a 90° angle to cover the inside of the cable tray as shown in FIGS. 31 through 34. Next bond SS to Ultraseal or THERMO-LAG. Use the Ultraseal to level along cable trays below the Stressskin as shown in FIG. 31. Place each 90° bent Stressskin type 330-69 about 3 to 4 inches apart over the troweled or foamed area.

Next pour THERMO-LAG liquid grade or Ultraseal (e.g., time release activated) into the dam. Assist gravity in filling the void from the top by using an ultrasonic probe (not shown) or some other vibrational or pressure device. FIG. 30 shows Ultraseal poured in between the dams with a novel bottom-applied vibrational technique. This procedure assures that Ultraseal fills all the voids between the cable quickly as it expands. Alternatively or in addition, pressure may be applied as shown in FIG. 33.

While Ultraseal is expanding, a prefab board may be cut to fit inside the cable tray as illustrated in FIG. 34. The dimension of the prefab board will be over the width and length of the opening, the thickness will depend on the fire rating desired, i.e., $\frac{1}{2}$ inch of THERMO-LAG for one-hour rating and one inch of THERMO-LAG for three-hour rating, and on the fire stop, or two to three inches of Ultraseal prefab material, and the height will be just the distance from highest cable to at least the top of tray, as shown in FIG. 34. The less dense Ultraseal will have thicknesses of from 2 to 3 inches or more depending on density. The fire rating is a function of mass and density of Ultraseal.

After the fire stop within the cable tray is completed, the cable tray penetration slot area is sealed. FIGS. 3 and 4 show how prefab barriers are cut to size and installed for a cable tray to plug the opening with at least suitable overlap to protect the fittings from fire from the backside. Suitable Ultraseal material will be added over fittings and along joints.

Figure 7:
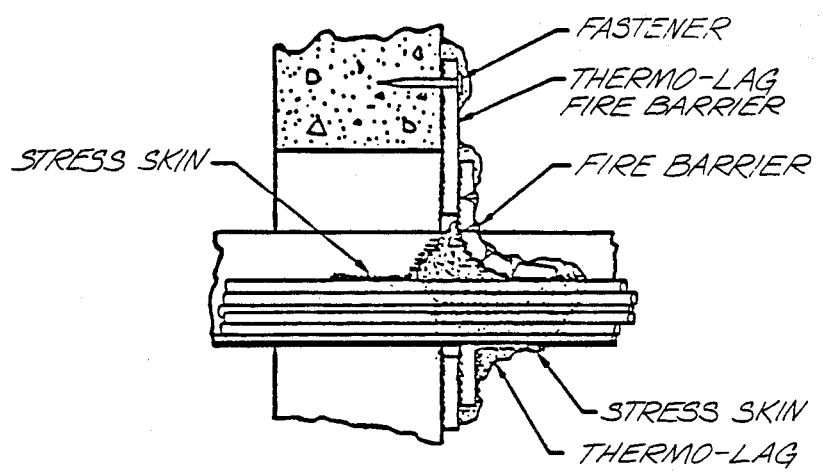
FIG. 7 illustrates in transverse cross section an alternative single cable tray wall penetration.
Figure 8:
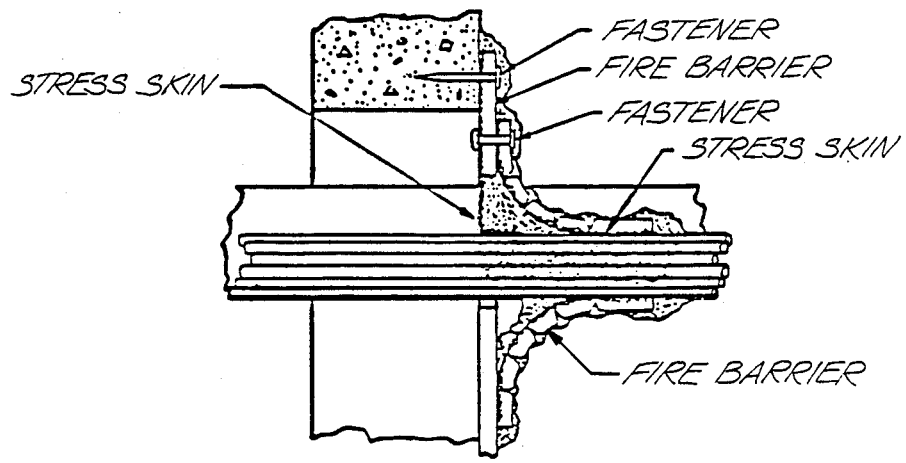
FIG. 8 illustrates still another embodiment of single cable tray wall penetration.
Figure 9:
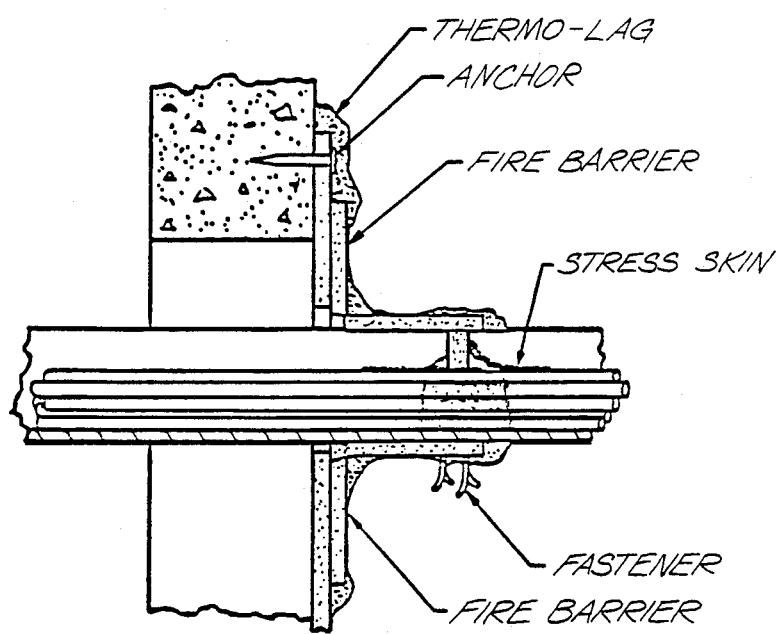
FIG. 9 illustrates still another embodiment of single cable tray wall penetration.

Another option is shown using prefab sections. FIGS. 7 and 8 show the stress skin formed along the cable surfaces of the cable within the trays. Mechanical fasteners or Ultraseal THERMO-LAG may be used to tack stress skin in place as shown in FIGS. 3 and 4. Next add preformed upper section (36), then set up ultrasonic probe from the top (not shown) or apply a bottom device, as shown in FIG. 32. Pour liquid Ultraseal into the opening between the dam and section (36) up to a predetermined level as calculated for adequate fire rating. Allow Ultraseal THERMO-LAG liquid to fill void as ultrasonics aid the process. The system may be tested using air pressure. If pressure test holds, other prefab sections that fit bottom of tray and overlap up to edge as shown in FIG. 3 are next installed.

Another alternative void filling technique can be employed. Add Ultraseal THERMO-LAG liquid and exert pressure on Ultraseal THERMO-LAG by pushing section (36) horizontally up against the wall penetration forcing the liquid Ultraseal THERMO-LAG down into the void in the cable. This process may be used with or without the aid of an ultrasonic device or of a thickening agent as described above; however, ultrasonic waves will improve reliability and speed in some cases. Alternately applying a mixture of a subliming mastic, e.g., THERMO-LAG, to a mixture of three solid elements (e.g., water-absorbent such as bentonite and soluble polycarbonic acid such as oxalic, tartaric, citric, etc., and a bicarbonate such as Na, K, Li, and Rb) in a special mixing gun as shown in FIGS. 40 and 41 to produce an Ultraseal foam. A procedure to complete the installation will involve a period of time for curing and hardening. Alternately, a time release coating which dissolves by chemical action accomplishes the same task at much lower costs. Next pressure test. If the test is negative, add more Ultraseal liquid and repeat. After a positive pressure test is established, add bottom precut section using mechanical fastener. Use trowelable grade to protect fittings, and to fill the void and joint areas between prefab section as shown in FIG. 3.

Fire stops for vertical cable tray runs and firebreaks are illustrated in FIGS. 20–30. The use of the novel V-dam, pressure squeeze method aids both of the ultrasonics and time release, e.g., mechanically mixed three-part additives agent, mechanisms and assures the rapid and even distribution of the liquid fire barrier material. A novel process using a foaming and viscosity increasing three-component solid additive system of material which may be mixed with the liquid fire barrier material such as THERMO-LAG 330-1. The foaming viscosity-increasing material may be encapsulated by this coating which ruptures upon the application of certain ultrasonic frequencies or chemical attack thus causing the mixture to expand and harden. Therefore, the ultrasonic system will not run at the point of intense ultrasonic application such as with 30K to 300 KHz ultrasonic waves. Alternately, the three-part solid system may be mixed in a gun just before application. The three solids are injected by pressure (e.g., air—not shown) or mechanical means and mixed within the gun. The rate of dissolution and reaction is controlled by at least four factors: particle size, solubility rate, mixing rate and temperature.

By applying the ultrasonic device to the section of the tray just below the area of material introduction, the material will all harden as gravity pulls it down to the area of application of the ultrasound. The foaming system will accomplish the same goal. The hardened material will form a vertical dam and the following material will seal behind it forming an excellent fire stop, CPS, pressure seal. The hardening material can consist of a chemical promoter or catalyst that is encapsulated in small microspheres or it can be high surface area materials such as silicon dioxide fibers, or similar ceramic material. The material can be agglomerated into small beads or be encapsulated in little microspheres. Water-absorbing materials may also be added. These are important because they expand in volume and aid in curing the water-based fire resistant material. The absorbed water can cause the mixture to increase in volume and then assure a very positive seal. The water-absorbent material may be coated with a first layer of the water-soluble polycarbonic acid and a second layer of bicarbonate. A passive layer may encapsulate the multi-layered bead to delay reaction until a predetermined time governed by the dissolution of the passive outer layer. A thin, water-soluble passive layer may separate the two active layers. Other passive coatings may be employed to operate a number of time release means with the mixture for a variety of applications.

The cable application procedure is as follows: Mix the viscosity additive with fire barrier material and then pour the mixture into "V" dam as shown in FIG. 25. Then squeeze and bend "V" dam as shown in FIG. 27. The foaming action of a three-part system of type 1 or 2 will expand to seal all voids. Alternately, the ultrasonic device may be used to apply ultrasonic waves just below the center of the "V" dam as shown in FIG. 26 to prevent running by activating a foaming or expanding reactant system. After the fire stop barrier between the cable is set, add precut prefab fire barrier section 300 and construct another stress skin dam V-2 above the board as shown in FIG. 29. Fill V-2 as shown in FIG. 29 and repeat process of squeezing V section as shown in FIG. 27. Applying ultrasonic waves may also be used as desired depending on the situation. The second prefab section is added.

Figure 10:
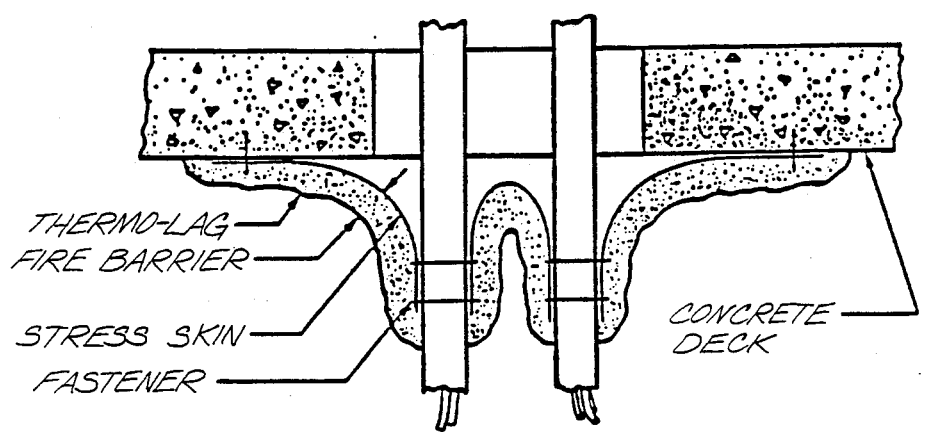
FIG. 10 illustrates in transverse cross section a multiple cable tray floor penetration.
Figure 11:
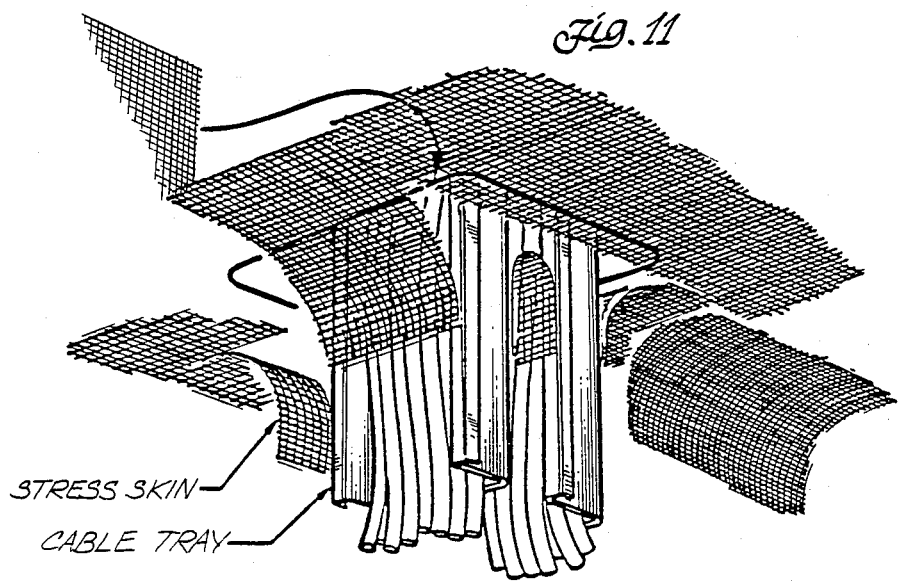
FIG. 11 illustrates pictorially from the bottom perspective and partly exploded, a multiple cable floor penetration as in FIG. 10 in an intermediate stage of construction.
Figure 20:
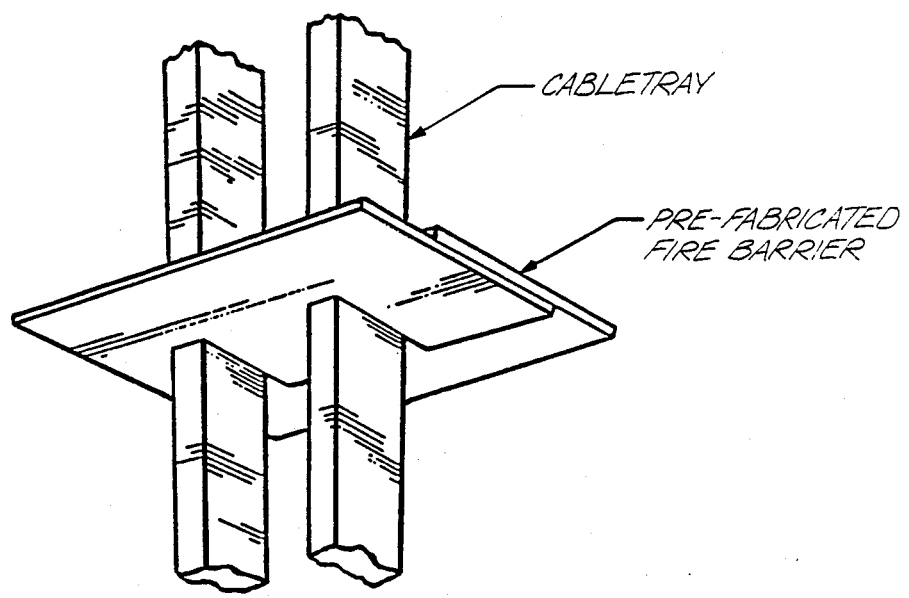
FIG. 20 is a pictorial view of a fire break or vertical cable tray runs.

FIGS. 5–19, 21 and 22 show various views of alternative horizontal cable penetration fire stop seals. FIGS. 10 and 11 show cable tray penetration of a vertical nature. They are constructed on the ceiling side. Fire breaks may be constructed using prefab sections 33 and 37 as shown in FIG. 20. Then add trowelable Ultraseal to stress skin or other screen to accomplish a bond to the cable tray and along all joints top and bottom.

Figure 12:
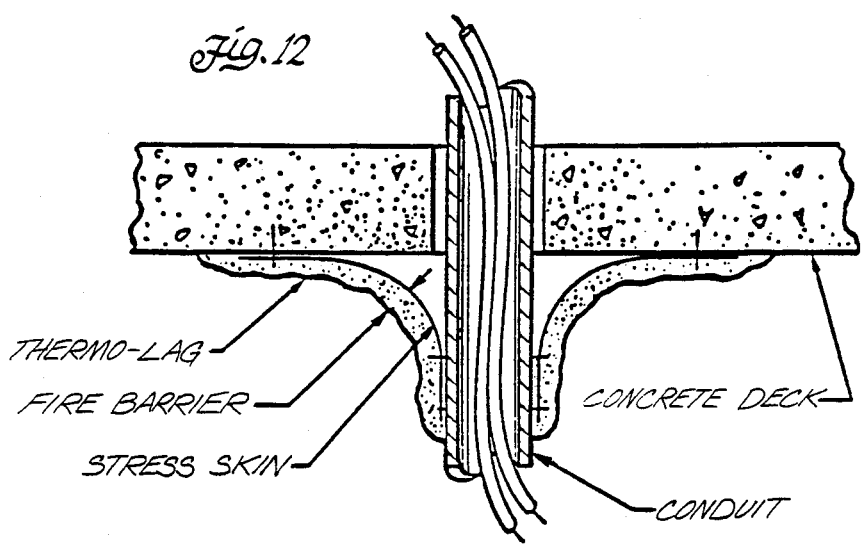
FIG. 12 illustrates in transverse cross section a single conduit floor penetration.
Figure 13:
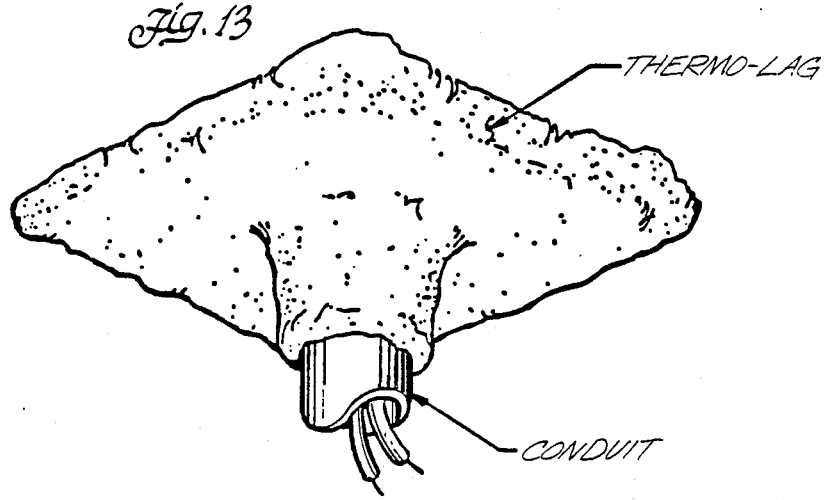
FIG. 13 is a bottom pictorial view of the floor penetration illustrated in FIG. 12.
Figure 14:
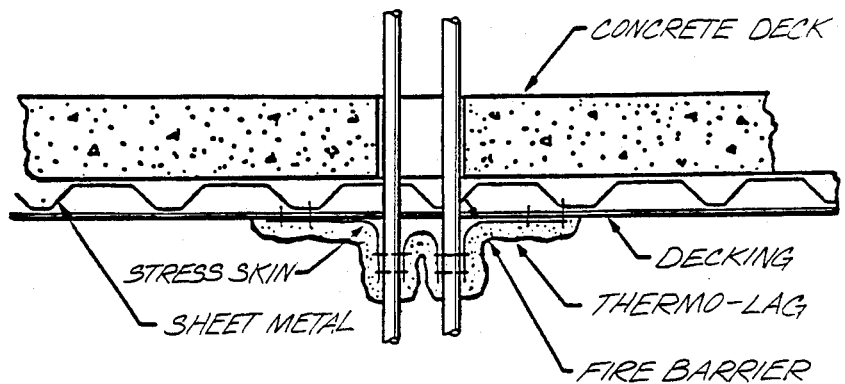
FIG. 14 illustrates in transverse cross section a multiple conduit floor penetration.
Figure 15:
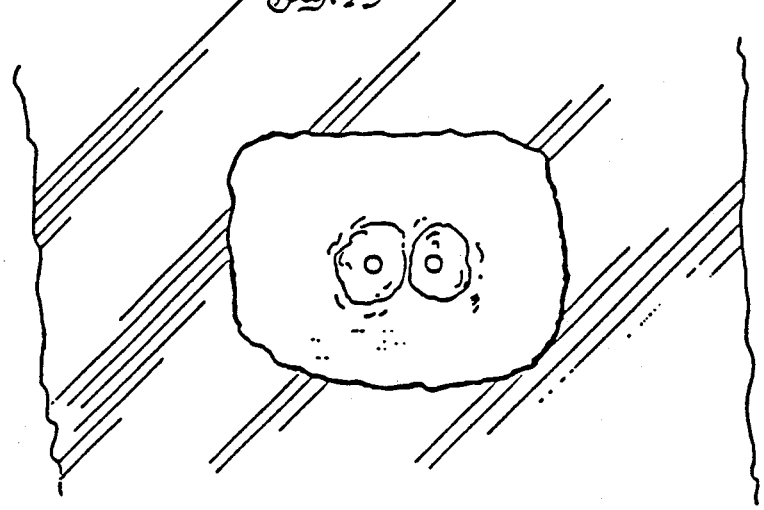
FIG. 15 is a bottom view of the floor penetration of FIG. 14.
Figure 16:
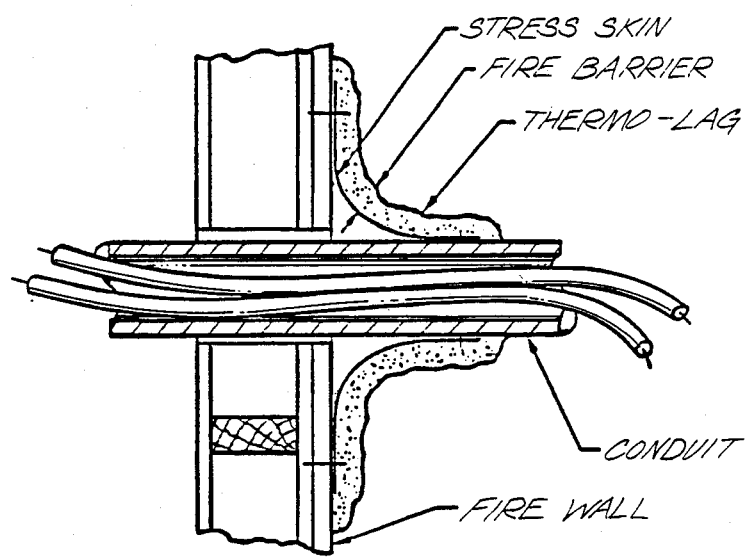
FIG. 16 illustrates in transverse cross section a single conduit wall penetration.
Figure 17:
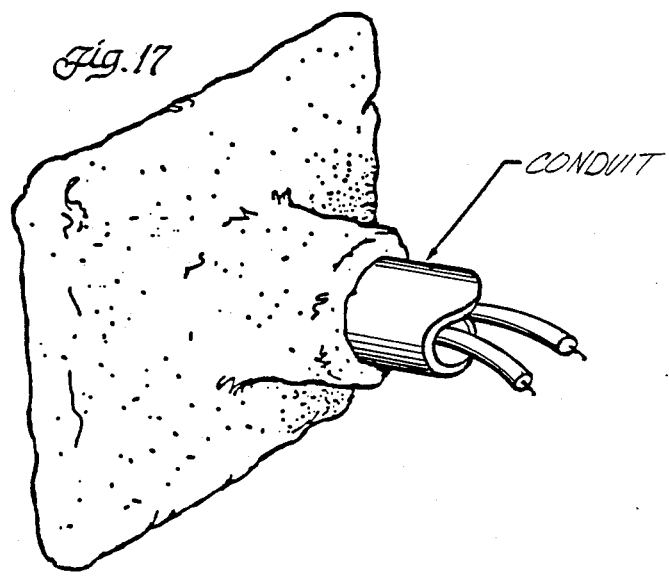
FIG. 17 is a pictorial view of the single conduit wall penetration of FIG. 16.

FIGS. 21 and 22 show additional views of the fire break design. FIGS. 12–19 show various conduit fire stops and seals. FIGS. 12 and 13 show single floor slot penetrations for conduit and FIGS. 14 and 15 show multiple floor penetrations. FIGS. 16 and 17, and 18 and 19 show single and multiple wall penetration fire stops.

Figure 18:
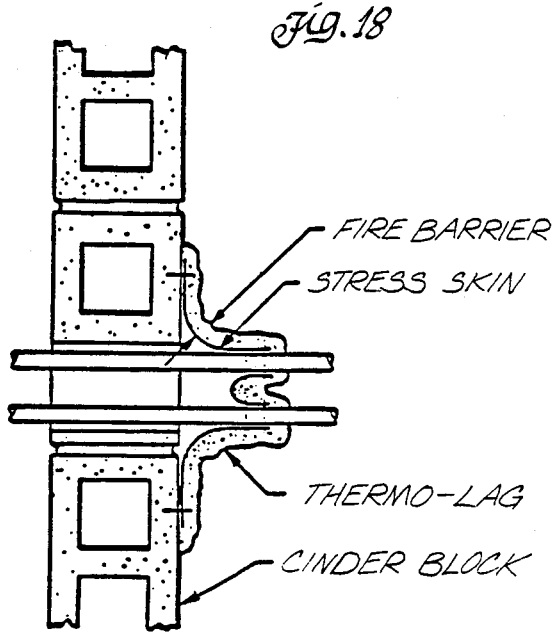
FIG. 18 is a transverse cross section of a multiple conduit penetration through a center block wall.
Figure 19:
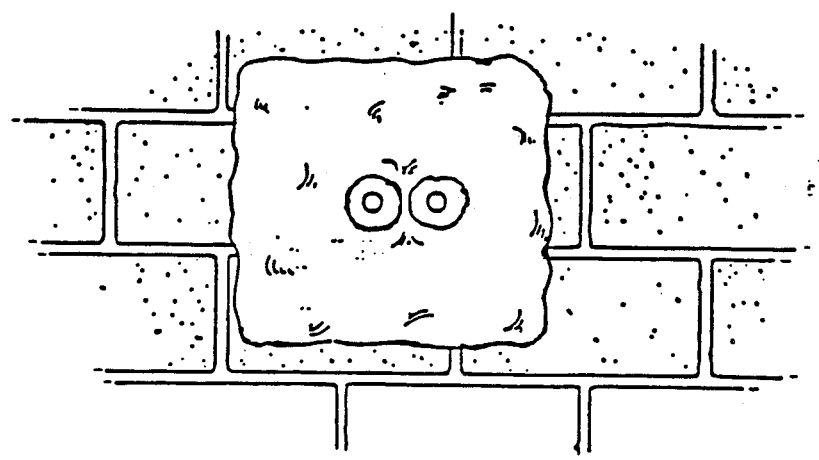
FIG. 19 is a face view of the wall penetration of FIG. 18.

The installation procedures for conduits and pipe penetrations are very similar to the cables and cable trays described above, i.e., stress skin is cut and bent 90°. Either THERMO-LAG or Ultraseal may be used to glue the SS 280 to the surface as shown in FIGS. 12 and 14. Mechanical fasteners 290 are wrapped around conduit as shown in FIGS. 14 and 18. Cut prefab Ultraseal THERMO-LAG or other prefab fire resistant section 344 are placed over the slot as shown in FIGS. 21 and 22. Fasten section 334 to wall using suitable mechanical fasteners. Caulk or trowel opening between stress skin and section 344 to produce conduit end fire stop, fill end of conduit with Ultraseal or THERMO-LAG (350) using ultrasonic, time release or mechanical mixing gun system with one or more additives and, in some special cases, pressure may be employed.

During installation, the prefab shapes are cut into several sections that overlap the opening which does not require very accurate cutting, as shown in FIGS. 3–9 and 20–34. These shapes are then assembled so as to assure adequate performance of the fire stop, and conformance to seismic qualifications, and other requirements.

For example, FIGS. 3-10 illustrate assembly of a single and multiple cable tray fire stop penetration through walls, floor and slots. The fire stop penetration seal is installed on only one side for most applications requiring one- or three-hour fire stops. However, for special cases when high pressure surge and nuclear radiation shielding are also required, the system may be applied to both sides with the special pressure resistant, fire resistant nuclear shielding material constructed into place as shown in FIG. 35. The material used for these shields may be an inorganic system, such as a ceramic or other mixture, which contains iron, lead, molybdenum, and/or other heavy metals or other nuclear radiation-absorbing materials. In addition, ceramic spheres, lead glass beads or hollow spheres coated with heavy metal or metal oxide can be employed as shielding material in the foam Ultraseal matrix.

To allow for movement of pipe, cable tray or conduit, special overlapping flexible section as shown in FIG. 35 can be employed, including weather coating or flexible boot seal. These boots and/or flexible covers can be applied after the center section (e.g., radiation shield) is completely installed. Also a compressible high viscosity fluid (such as a fire resistant silicone grease, fire resistant foam, or other similar material) can be employed along the surface of the pipe or conduit to make the clearance in FIG. 35 more air- and water-tight (not shown). The grease may be coated onto the metal surface before the fire stops are constructed. Then the one fire stop is put in place and the other partially constructed. The radiation shielding may be injected to overflow conditions. The system is allowed to harden and then the outer flexible seal is closed under slight pressure by a mechanical fastener. A top coat of Ultraseal is then applied to the outside of the flexible boot to prevent damage to the boot during fire or to prevent damage from certain chemicals or other exposures.

These fire stops may be applied to various configurations on walls, ceilings, floors, decks, hulls, and other fire barriers as shown in FIGS. 1, 1A, and 2-30. The requirements of the system dictate various modifications in design which will be apparent to those skilled in the art.

The fire break and fire-stop designs shown in the FIG. 1-30 using THERMO-LAG 330-1 have been tested in accordance with applicable sections of the following standards, codes, and regulations.

1. American Society for Testing Material (ASTM)

ASTM E119-82 "Standard Method of Fire Tests of Building Construction and Materials". ASTM E-84-81a "Surface Burning Characteristics of General Purpose Coatings".

2. American Nuclear Insurers

Bulletin #7(79) "ANI/MAERP Standard Method of Fire Tests of Cable and Pipe Penetration Fire-Stops". February 1976.

3. Institute of Electrical and Electronics Engineers (IEEE) IEEE Standard 634-1978 "IEEE Standard Cable Penetration Fire-Stop Qualification Test".

The use of prefabricated sections of THERMO-LAG 330 Fire-Stop Design has been tested in accordance with the requirements of ANI/MAERP Standard Method of Fire Tests of Cable and Pipe Penetration Fire-Stops and ASTM E119-82. Based on similar test results and analysis, the Ultraseal Fire-Stop Design is preferred and also meets all of the prerequisites of the aforementioned standards, except that application will be much faster and therefore much less expensive to install. Since the Ultraseal Fire Break System is another application design of the Ultraseal THERMO-LAG 330 Fire-Stop System, and is comprised of the same components as those tested for the latter design, it also meets all of the previously-mentioned standards.

The Fire-Stop Design successfully prevented the passage of flame through the opening or the occurrence of flaming of elements on the unexposed side of the fire-stop during the one and three-hour ASTM E119 fire tests. It prevented the temperature on any individual thermocouple on the unexposed side of the fire-stop assembly from exceeding 325° F. above ambient during both tests.

Another important requirement which is met by Ultraseal but not by the THERMO-LAG system is that of ease of repair. The Ultraseal is soft enough to penetrate with a sharp wooden tool so a new cable can be added without using sharp metal tools.

Following each fire test, the Ultraseal THERMO-LAG 330 Fire-Stop Design was subjected to and successfully withstood a water hose stream test without the hose stream causing an opening to develop through the fire-stop. Subsequent tests, involving subjecting the Ultraseal THERMO-LAG 330 Fire-Stop Design to a thirty (30) minute water sprinkler discharge, demonstrated the capability of the design to withstand such a continuous discharge without necessitating the replacement of fire-stop material.

Various Ultraseal mixtures can be made to continue to expand for a predetermined period of time by the continual chemical reaction which can be controlled by the size, surface area and shape and protective dissolving films of various thicknesses and dissolution properties.

The use of a two or more component system of a solid and a liquid can use a thin membrane dissolution technique to activate an acid/base foaming reaction which releases carbon dioxide. This causes the Ultraseal material to expand. Alternatively, solids of at least one bicarbonate and an acid along with bentonite or other water-adsorbing material may be mixed in an Ultraseal gun as seen in FIGS. 40 and 41. FIG. 41 shows a mixing gun 102 with a nozzle 106 being the exit point of the mixture (not shown). The solid material(s) 202 are fed into the mixing gun 102 through the inlet port through coupling 128. The liquid material is fed through the liquid port 126 by an outside pumping system (not shown). The solid 202 is fed by an auger 116 and a main pressure system (not shown). The mixing auger system 114 carries the solids (not shown) to the port 117 and the auger 116 removes the material into the final mixing chamber 104 where it contacts the THERMO-LAG or other water-based fire resistant liquid from inlet 110. The THERMO-LAG or other liquid is kept from backing up by air pressure exhaust from an air pump 250 or other pressure device. The air pressure and the auger motion aid the liquid pump pressure created by L pump 215 through a static mixer 260 (optional), then to the nozzle 106 which directs the mix to the application point. The particles of the three-component system may be formed as concentric shells around a solid agglomeration particle as depicted in FIGS. 45 and 46. The gun expels the Ultraseal foam into the void.

FIG. 52 illustrates the three-component system (215) which consists of water absorber (240), a carboxylic acid (245), and a bicarbonate (247). At least one of the active foaming agents (245) and (247) may be coated with a time release agent (210). The release agent may be dissolved by chemical action or fracture by ultrasonic or mechanical means.

At least a two-part foaming solids system (216) may be coated (optional) (210) and added separately. A multiple layer system of two reactive chemicals (220), each layer being separated from the other by a passive layer (210), is shown in FIG. 46. The water-absorbing and expanding material (240) is surrounded by a foaming agent (245), which is surrounded by the passive layer (210), and dissolves in a predetermined time upon contact with the liquid mixture. For example, bentonite (240) may be coated with a mild acid such as oxalic (245), malonic and other water-soluble low carbon polycarboxylic acids (245), then coated with a water-soluble inactive coating (210) layer such as a silicone, sodium borate, sodium silicate, etc. Then a layer of a second foaming agent such as sodium bicarbonate (250) is coated over the neutral layer which may also serve as a time release agent or may be fractured by ultrasonic, mechanical or pressure.

The coatings may be accomplished in a fluidized bed system, spraying with concentrated solution, or by dipping or immersing the particles at least once in at least one highly concentrated solution of coating material.

Single-coated or multiple-layered particles are then added to an ultrasonic mixing gun or mechanical mixing gun, a subliming mastic such as THERMO-LAG 330-1, or other water-based sealant material. The amount of active materials used for coating can be controlled to produce foaming in the subliming mastic and other water-based sealants.

The additive 402 may be separate particles as shown in FIG. 43 or may be layered about any one component or the center, for example. Element 400 is preferably bentonite, 404 is preferably bicarbonate, 406 is preferably oxalate or oxalic acid and 408 is a suitable protective layer; however, it is understood that any one of the elements may be replaced by similar elements in their respective groups as discussed above. The elements may be combined as illustrated in FIG. 42 to provide the desired dissolution and reaction. FIG. 44 illustrates oxalate or oxalic acid at the core 406a surrounded by a layer of bentonite 400a which in turn is coated with bicarbonate 404a which may be further surrounded by protective layer which is designed to dissolve at a predetermined time 410a (optional).

What is claimed is:

1. A method for sealing a port in a wall through which an element is passed, the method comprising the steps of combining a water based active fire-resistant material and sufficient solid water absorbing means which will swell to prevent shrinkage to form a mixture that seals without substantial shrinkage, and introducing the mixture into the port to seal the port.

2. The method as claimed in claim 1 wherein the solid water absorbing means comprises a hydrophilic material that swells upon hydration.

3. The method as claimed in 2 wherein the hydrophilic material comprises bentonite.

4. The method as claimed in claim 3 wherein the fire-resistant material comprises a fire protection and sealing material containing an endothermic chemical system that absorbs heat at a specific temperature.

5. The method as claimed in claim 4 wherein the fire protection and sealing material comprises an active subliming fire protective ingredient.

6. The method as claimed in claim 2 wherein the mixture further comprises a gas generating additive for foaming the mixture.

7. The method as claimed in claim 6 wherein the gas generating additive comprises a bicarbonate selected from the group of alkali metal bicarbonates and ammonium bicarbonate, and sufficient weak acid to generate carbon dioxide from the bicarbonate.

8. A seal for a first member having a void through which a second member extends formed by the application of a sealing material, a foaming agent and a water-absorption agent to the void and adjacent the second member for sealing the first member by the production of gas by the foaming agent throughout the sealing material resulting in expansion of the sealing material and absorption of water by the water-absorbing agent throughout the sealing material for substantially preventing shrinkage of the seal.

9. The seal as claimed in claim 8 wherein the sealing material comprises an active subliming fire protective ingredient, and the foaming agent comprises an acid and gas-forming means.

10. The seal as claimed in claim 8 wherein the acid comprises a polycarboxylic acid.

11. The seal as claimed in claim 10 wherein the polycarboxylic acid comprises oxalic acid.

12. The seal as claimed in claim 8 wherein the gas-forming means comprises bicarbonate.

13. The seal as claimed in claim 8 wherein the water-absorbing means comprises bentonite.

14. A composition comprising:
   a curable water-based active fire-resistant composition;
   a bicarbonate selected from the group consisting of alkali metal bicarbonates and ammonium bicarbonate;
   sufficient solid weak acid to release carbon dioxide from the bicarbonate; and
   at least one solid water-absorbing material.

15. A composition as recited in claim 14 wherein the bicarbonate is sodium bicarbonate.

16. A composition as recited in claim 15 wherein the water absorbing material comprises bentonite.

17. A composition as recited in claim 16 wherein the acid is oxalic acid.

18. A composition as recited in claim 15 wherein the acid is oxalic acid.

19. A composition as recited in claim 14 wherein the acid is oxalic acid.

20. A composition as recited in claim 19 wherein the water absorbing material comprises bentonite.

21. A composition as recited in claim 14 wherein the water absorbing material comprises bentonite.

22. A composition as recited in claim 14 wherein the bicarbonate, acid and water absorbing material are present in the range of from 1 to 15 percent by weight.

23. A composition as recited in claim 14 wherein the bicarbonate, acid and water absorbing material are present in the range of from 3 to 8 percent by weight.

24. A composition as recited in claim 14 wherein the fire-resistant composition includes a material that sublimes when its temperature reaches a specific temperature.

25. A composition as recited in claim 24 where in the fire-resistant composition also intumesces before subliming.

26. A method as recited in claim 14 wherein the bicarbonate, acid and water absorbing materials are present in excess of three percent by weight.

27. A method of sealing a void with a fire-resistant plug comprising:

mixing a curable water-based fire-resistant composition with a bicarbonate selected from the group consisting of alkali metal bicarbonates and ammonium bicarbonate; sufficient solid weak acid to release carbon dioxide from the carbonate; and at least one solid water-absorbing material; and introducing the mixture into the void before foaming occurs and retaining the mixture in the void until foaming and curing are complete.

28. A method as recited in claim 27 wherein the bicarbonate is sodium bicarbonate.

29. A method as recited in claim 28 wherein the water absorbing material comprises bentonite.

30. A method as recited in claim 27 wherein the water absorbing material comprises bentonite.

31. A method as recited in claim 27 wherein the bicarbonate, acid and water absorbing additive are present in the range of from 1 to 15 percent by weight.

32. A method as recited in claim 31 wherein the bicarbonate, acid and water absorbing materials are present in excess of three percent by weight.

* * * * *